(12) United States Patent
Takahara et al.

(10) Patent No.: US 8,470,909 B2
(45) Date of Patent: Jun. 25, 2013

(54) TIRE PUNCTURE SEALANT

(75) Inventors: Hideyuki Takahara, Hiratsuka (JP); Takahiro Okamatsu, Hiratsuka (JP)

(73) Assignee: The Yokohama Rubber Co., Ltd. (JP)

( * ) Notice: Subject to any disclaimer, the term of this patent is extended or adjusted under 35 U.S.C. 154(b) by 40 days.

(21) Appl. No.: 13/094,776

(22) Filed: Apr. 26, 2011

(65) Prior Publication Data

US 2011/0201722 A1 Aug. 18, 2011

(30) Foreign Application Priority Data

Jun. 22, 2009 (JP) ................................. 2009-147869

(51) Int. Cl.
*B60C 19/00* (2006.01)

(52) U.S. Cl.
USPC ........... 523/166; 524/243; 524/376; 524/563; 524/575.5

(58) Field of Classification Search
USPC ........................................................ 523/166
See application file for complete search history.

(56) References Cited

U.S. PATENT DOCUMENTS

| | | | |
|---|---|---|---|
| 4,806,590 A | 2/1989 | Padget et al. | |
| 5,091,447 A * | 2/1992 | Lomasney | 523/408 |
| 5,610,212 A * | 3/1997 | Tanaka et al. | 524/156 |
| 5,739,196 A | 4/1998 | Jenkins et al. | |
| 6,063,837 A | 5/2000 | Kawamura et al. | |
| 6,329,447 B1 | 12/2001 | Avramidis et al. | |
| 6,344,499 B1 | 2/2002 | Kawamura et al. | |
| 2008/0306197 A1 | 12/2008 | Yanagi et al. | |
| 2009/0023837 A1 | 1/2009 | Okamatsu et al. | |
| 2010/0331449 A1* | 12/2010 | Ishida et al. | 523/166 |
| 2011/0003920 A1* | 1/2011 | Matsuda et al. | 524/156 |
| 2011/0086944 A1 | 4/2011 | Schunack et al. | |

FOREIGN PATENT DOCUMENTS

| | | |
|---|---|---|
| DE | 10 2008 033 514 A1 | 2/2009 |
| DE | 10 2008 007 992 A1 | 8/2009 |
| DE | 102008007992 * | 8/2009 |
| JP | 3751729 | 8/1998 |
| JP | 2001198986 | 7/2001 |
| JP | 4109435 | 3/2003 |
| JP | 2006111726 | 4/2006 |
| JP | 2006152239 | 6/2006 |
| JP | 2007182583 | 7/2007 |
| JP | 2009051893 | 3/2009 |
| JP | 2010-043155 A * | 2/2010 |
| WO | WO2008149898 | 12/2008 |
| WO | WO2008149899 | 12/2008 |

OTHER PUBLICATIONS

Machine Translation of JP 043155 A obtained on Oct. 12, 2012.*
U.S. Appl. No. 12/819,733; filed Jun. 21, 2010; Hideyuki Takahara; office action issued Aug. 3, 2011.
PCT Application PCT/JP2010/056831; filed Apr. 16, 2010; The Yokohama Rubber Co., Ltd, et al.; report mailed Jan. 26, 2012.

* cited by examiner

*Primary Examiner* — Nicole M Buie-Hatcher
*Assistant Examiner* — Chelsea M Lowe
(74) *Attorney, Agent, or Firm* — Thrope North & Western LLP

(57) ABSTRACT

A tire puncture sealant is disclosed and described. Such a sealant may include a natural rubber latex and a surfactant, wherein a content of the surfactant is from 1.0 to 6.0 mass % of a solid content of the natural rubber latex and the surfactant includes a non-ionic surfactant and an anionic surfactant at a mass ratio where the non-ionic surfactant/the anionic surfactant=1.0/1.0 to 1.0/5.0.

11 Claims, 5 Drawing Sheets

FIG. 1

| | | | | Working Examples | | | | | | | | | | | |
|---|---|---|---|---|---|---|---|---|---|---|---|---|---|---|---|
| | | | 1 | 2 | 3 | 4 | 5 | 6 | 7 | 8 | 9 | 10 | 11 | 12 | 13 |
| A | NR latex | | 50 | 50 | 50 | 50 | 50 | 50 | 50 | 50 | 50 | 50 | 50 | 50 | 50 |
| B | B1 | Non-ionic surfactant (1) | 0.5 | 0.4 | 0.5 | 0.5 | 0.4 | 0.5 | 0.5 | 0.4 | 0.5 | | | | 0.3 |
| | | Non-ionic surfactant (2) | | | | | | | | | | 0.5 | | | |
| | | Non-ionic surfactant (3) | | | | | | | | | | | 0.5 | | |
| | | Non-ionic surfactant (4) | | | | | | | | | | | | 0.5 | 0.2 |
| | | Non-ionic surfactant (5) | | | | | | | | | | | | | |
| | B2 | Anionic surfactant | 0.5 | 0.8 | 2.5 | 0.5 | 0.8 | 2.5 | 0.5 | 0.8 | 2.5 | 0.5 | 0.5 | 0.5 | 0.5 |
| C | EVA emulsion 1 | | 50 | 50 | 50 | | | | | | | 50 | | | |
| | EVA emulsion 2 | | | | | 50 | 50 | 50 | | | | | 50 | | |
| | EVA emulsion 3 | | | | | | | | 50 | 50 | 50 | | | 50 | 50 |
| | EVA emulsion 4 | | | | | | | | | | | | | | |
| D | Antifreezing agent | | 110 | 110 | 110 | 110 | 110 | 110 | 110 | 110 | 110 | 110 | 110 | 110 | 110 |
| E | Viscosity modifier | | 7 | 7 | 7 | 7 | 7 | 7 | 7 | 7 | 7 | 7 | 7 | 7 | 7 |
| Surfactant content (mass%) | | | 2 | 2.4 | 6 | 2 | 2.4 | 6 | 2 | 2.4 | 6 | 2 | 2 | 2 | 2 |
| Surfactant composition ratio (mass ratio) | | | 1.0/1.0 | 1.0/1.0 | 1.0/5.0 | 1.0/1.0 | 1.0/2.0 | 1.0/5.0 | 1.0/1.0 | 1.0/2.0 | 1.0/5.0 | 1.0/1.0 | 1.0/1.0 | 1.0/1.0 | 1.0/1.0 |
| Physical properties | Viscosity (mPa·s, 20°C) | | 33.5 | 34.1 | 42.5 | 34.4 | 34.7 | 44.1 | 31 | 32.4 | 38.6 | 34 | 35.4 | 32.2 | 32.7 |
| Sealing performance | Center groove portion | | ○ | ○ | ○ | ○ | ○ | ○ | ○ | ○ | ○ | ○ | ○ | ○ | ○ |
| | Shoulder groove portion | | ○ | ○ | ○ | ○ | ○ | ○ | ○ | ○ | ○ | ○ | ○ | ○ | ○ |
| Storage performance | Storage stability | | ○ | ○ | ◉ | ○ | ○ | ◉ | ○ | ○ | ◉ | ○ | ○ | ○ | ○ |
| | Viscosity stability | | ○ | ○ | ○ | ○ | ○ | ○ | ○ | ○ | ○ | ○ | ○ | ○ | ○ |

| | | | Working Examples | | | | | | | | |
|---|---|---|---|---|---|---|---|---|---|---|---|
| | | | 14 | 15 | 16 | 17 | 18 | 19 | 20 | 21 | 22 |
| A | NR latex | | 50 | 50 | 50 | 50 | 50 | 50 | 50 | 50 | 50 |
| B | B1 | Non-ionic surfactant (1) | 0.5 | 1 | 1.5 | 0.5 | 0.5 | | | | |
| | | Non-ionic surfactant (2) | | | | | | 1 | | | |
| | | Non-ionic surfactant (3) | | | | | | | 1 | | |
| | | Non-ionic surfactant (4) | | | | | | | | 1 | |
| | | Non-ionic surfactant (5) | | | | | | | | | 1 |
| | B2 | Anionic surfactant | 0.5 | 1 | 1.5 | 0.5 | 0.5 | 1 | 1 | 1 | 1 |
| C | EVA emulsion 1 | | | | | | | | | | |
| | EVA emulsion 2 | | | | | | | | | | |
| | EVA emulsion 3 | | | | | | | | | | |
| | EVA emulsion 4 | | 50 | 50 | 50 | 50 | 50 | 50 | 50 | 50 | 50 |
| D | Antifreezing agent | | 110 | 110 | 110 | 110 | 110 | 110 | 110 | 110 | 110 |
| E | Viscosity modifier | | 7 | 7 | 7 | 7 | 7 | 7 | 7 | 7 | 7 |
| Surfactant content (mass%) | | | 2 | 4 | 6 | 2 | 2 | 4 | 4 | 4 | 4 |
| Surfactant composition ratio (mass ratio) | | | 1.0/1.0 | 1.0/1.0 | 1.0/1.0 | 1.0/1.0 | 1.0/1.0 | 1.0/1.0 | 1.0/1.0 | 1.0/1.0 | 1.0/1.0 |
| Physical properties | Viscosity (mPa·s, 20°C) | | 50 | 50 | 52.5 | 50 | 52.5 | 50 | 50 | 50 | 50 |
| Sealing performance | Center groove portion | | ○ | ○ | ○ | ○ | ○ | ○ | ○ | ○ | ○ |
| | Shoulder groove portion | | ◉ | ◉ | ○ | ◉ | ◉ | ◉ | ◉ | ◉ | ◉ |
| Storage performance | Storage stability | | ○ | ○ | ○ | ○ | ○ | ○ | ○ | ○ | ○ |
| | Viscosity stability | | ○ | ○ | ○ | ○ | ○ | ○ | ○ | ○ | ○ |

FIG. 2

|   |   |   | \multicolumn{10}{c}{Comparative Examples} |
|---|---|---|---|---|---|---|---|---|---|---|---|---|
|   |   |   | 1 | 2 | 3 | 4 | 5 | 6 | 7 | 8 | 9 | 10 |
| A | NR latex | | 50 | 50 | 50 | 50 | 50 | 50 | 50 | 50 | 50 | 50 |
| B | B1 | Non-ionic surfactant (1) | 0.5 | 0.3 | 4 | | | 2 | 0.5 | 0.5 | 0 | 2 |
|   |   | Non-ionic surfactant (2) | | | | | 0.125 | | | | | |
|   |   | Non-ionic surfactant (3) | | | | 0.5 | | | | | | |
|   |   | Non-ionic surfactant (4) | | | | | | | | | | |
|   |   | Non-ionic surfactant (5) | | | | | | | | | | |
|   | B2 | Anionic surfactant | 0.3 | 0.3 | 3 | 0.3 | 0.125 | 2 | 3.5 | 0.25 | 2 | 0 |
| C | EVA emulsion 1 | | 50 | 50 | 50 | 50 | 50 | | | | | |
|   | EVA emulsion 2 | | | | | | | 50 | 50 | 50 | 50 | 50 |
|   | EVA emulsion 3 | | | | | | | | | | | |
|   | EVA emulsion 4 | | | | | | | | | | | |
| D | Antifreezing agent | | 110 | 110 | 110 | 110 | 110 | 110 | 110 | 110 | 110 | 110 |
| E | Viscosity modifier | | 7 | 7 | 7 | 7 | 7 | 7 | 7 | 7 | 7 | 7 |
| Surfactant content (mass%) | | | 1.6 | 1.2 | 14 | 1.6 | 0.5 | 8 | 8 | 1.5 | 4 | 4 |
| Surfactant composition ratio (mass ratio) | | | 1.0/0.6 | 1.0/1.0 | 1.0/0.75 | 1.0/0.6 | 1.0/1.0 | 1.0/1.0 | 1.0/7.0 | 1.0/0.5 | B2 only | B1 only |
| Physical properties | Viscosity (mPa·s, 20°C) | | 33.2 | 34.1 | 38.9 | 34.7 | 50 | 55 | — | 50 | 50 | 50 |
| Sealing performance | Center groove portion | | ○ | ○ | × | ○ | ○ | — | — | ○ | ○ | ○ |
|   | Shoulder groove portion | | ○ | × | × | ○ | ⊙ | × | × | ⊙ | ⊙ | ⊙ |
| Storage performance | Storage stability | | ○ | ○ | ⊙ | × | × | ○ | ○ | ○ | × | ○ |
|   | Viscosity stability | | × | ○ | ⊙ | × | × | ○ | ○ | × | ○ | × |

|   |   | Manufacturing Examples | | | | | | | | | |
|---|---|---|---|---|---|---|---|---|---|---|---|
|   |   | 1 | 2 | 3 | 4 | 5 | 6 | 7 | 8 | 9 | 10 |
| A | NR latex | 100 | 100 | 120 | 70 | 100 | 100 | 100 | 100 | 100 | 140 |
| B | Non-ionic surfactant (1) | 0.5 | 0.5 | 0.5 | 0.5 | 0.6 | 0.6 | 0.7 | 0.7 | 1 | 1 |
|   | Anionic surfactant | 1 | 1 | 1 | 1 | 0.7 | 0.7 | 0.5 | 0.5 | 1 | 1 |
| C | EVA emulsion 1 | 100 |   |   |   |   | 100 |   |   |   | 100 |
|   | EVA emulsion 3 |   | 100 | 100 |   | 100 |   |   | 100 |   |   |
|   | EVA emulsion 4 |   |   |   | 100 |   |   | 100 |   | 100 |   |
| D | Propylene glycol | 250 | 250 | 250 | 600 |   |   |   |   | 250 | 250 |
|   | Di(ethylene glycol) |   |   |   |   | 100 | 600 | 100 |   |   |   |
|   | Glycerin |   |   |   |   |   |   |   | 600 |   |   |
| Increase in temperature Δt (°C) | | 5 | 5 | 7 | 9 | 7 | 10 | 7 | 9 | 8 | 5 |
| Amount of NR gel produced (mass%) | | <0.5 | <0.5 | <0.5 | <0.5 | <0.5 | <0.5 | <0.5 | <0.5 | <0.5 | <0.5 |
| Evaluation | | A | A | A | A | A | A | A | A | A | A |

FIG. 5

| | | Manufacturing Examples | | | | | | | | | |
|---|---|---|---|---|---|---|---|---|---|---|---|
| | | 11 | 12 | 13 | 14 | 15 | 16 | 17 | 18 | 19 | 20 |
| A | NR latex | 100 | 100 | 100 | 50 | 50 | 50 | 150 | 150 | 150 | 150 |
| B | Non-ionic surfactant (1) | 0.5 | 0.5 | 0.5 | 0.3 | 0.4 | 0.4 | 0.2 | 1.5 | 0.2 | 1.5 |
| | Anionic surfactant | 1 | 1 | 1 | 0.4 | | | 0.2 | 1.5 | 0.3 | 2 |
| C | EVA emulsion 1 | | | | | 100 | 100 | | 100 | | |
| | EVA emulsion 3 | | | | 100 | | | | | | 100 |
| | EVA emulsion 4 | 100 | 100 | 100 | | | | 100 | | 100 | |
| D | Propylene glycol | 50 | | | 650 | | | 650 | 650 | 650 | 650 |
| | Di(ethylene glycol) | | 50 | | | 700 | | | | | |
| | Glycerin | | | 50 | | | 700 | | | | |
| Increase in temperature Δt (°C) | | 2 | 2 | 2 | 13 | 15 | 15 | 12 | 14 | 15 | 12 |
| Amount of NR gel produced (mass%) | | <0.5 | <0.5 | <0.5 | 3.5 | 3.9 | 4 | 3.5 | 2.9 | 6.7 | 0.9 |
| Evaluation | | A | A | A | E | E | E | E | D | E | B |

TIRE PUNCTURE SEALANT

PRIORITY CLAIM

This application is a continuation of International Application No. PCT/JP2010/056831, filed on Apr. 16, 2010, which claims priority to Japan Patent Application Serial No. 2009-147869 filed on Jun. 22, 2009.

BACKGROUND

1. Technical Field

The present technology relates to a tire puncture sealant and more specifically relates to a tire puncture sealant including a natural rubber and a surfactant.

2. Related Art

Automobile manufacturers are more frequently providing puncture repair kits as standard or optional equipment. Such puncture repair kits contain a tire puncture sealant as an essential constituent and can also include a compressor as an optional constituent. Actual products are generally compact packages that combine the tire puncture sealant, known as an "emergency tire puncture repairing agent" or the like, and a low capacity compressor that draws power via a cigarette lighter socket.

Japanese Patent No. 3751729 describes a puncture sealant for sealing an inner-cavity surface of a tire formed from a deproteinized rubber latex produced by removing protein contained in rubber particles in crude rubber from a natural rubber latex. Moreover, the puncture sealant is described as including a nitrogen content of 0.1 wt % or less and an ammonia content of 0.5 wt % or less but 0.1 wt % or greater per a rubber solid content of the deproteinized rubber latex, which can enhance the sealing effect while maintaining superior decomposition resistance and liquefaction stability, and, moreover, can prevent corrosion damage to steel cords and irritating odor caused by ammonia (paragraphs 0010 and 0047). This puncture sealant preferably includes from 0.01 to 1.8 wt % of a surfactant per the rubber solid content of the deproteinized rubber latex as a stabilizer (paragraph 0012). Examples of the stabilizer that can be used include carboxylic acids, sulfonic acids, sulfate esters, phosphoric acid esters, or similar anionic surfactants; and/or polyoxyalkylene ethers, polyoxyalkylene esters, polyhydroxy alcohol fatty esters, sucrose fatty acid esters, alkylpolyglycosides, or similar nonionic surfactants. Furthermore, among carboxylic acid anionic surfactants, fatty acid salts and rosinate salts are preferable, and among polyoxyalkylene ether nonionic surfactants, polyoxyethylene alkyl ethers, polyoxyethylene alkyl phenyl ethers, polyoxyethylene lauryl ether sodium sulfates (Emal E-70C, manufactured by Kao Corporation), and the like are preferable (paragraph 0033). Additionally, it is described that using potassium rosinate as the stabilizer is preferable for the purposes of initiating the crosslinking of the rubber particles in the latex via stimulation such as pressure or the like, heightening of solidification and coagulation properties, which are pressure-sensitive properties, and enhancing sealability (paragraph 0012).

Japanese Patent No. 4109435 describes a puncture sealant for sealing an inner-cavity surface of a tire formed from a deproteinized rubber latex produced by removing protein contained in rubber particles in crude rubber from a natural rubber latex; and including a tackifier, an antifreezing agent, and a surfactant; wherein the puncture sealant is described as including a nitrogen content of 0.1 wt % or less and an ammonia content of 0.5 wt % or less per a rubber solid content of the deproteinized rubber latex. One or more of ethylene glycol and propylene glycol is used as the antifreezing agent, and, moreover, this glycol constitutes more than 25 wt % and 35 wt % or less per a gross weight of the puncture sealant. Additionally, the surfactant is a mixture including ammonium laurate or triethanolamine laurate and a fatty acid salt having a carbon number of 9 to 18. Thereby, a puncture sealant for tires is described in which storage performance can be enhanced and solidification of the rubber component while in storage that leads to injectability and sealability being hindered can be prevented (paragraphs 0008 and 0028). Additionally, it is described that ammonium laurate and triethanolamine laurate can be more preferably used because they display particularly superior coagulation suppressing effects, and, moreover, have properties that make possible the enhancement of said coagulation suppressing effects proportional to a content thereof (paragraph 0019).

Japanese Unexamined Patent Application Publication No. 2006-111726 describes a puncture sealant for sealing a hole of a punctured tire. This puncture sealant includes a natural rubber latex and a antifreeze liquid, and further includes a resin-based emulsion. It is described that the sealing speed of a puncture hole is fast and that the puncture sealant has long term stability (paragraphs 0005 and 0007). Additionally, it is described that in the resin-based emulsion, a nonionic surfactant is used for the emulsifier; and at least one selected from a modified phenolic resin, a petroleum resin, and a carboxylic acid modified terpene resin is used for the resin component (paragraph 0006). Moreover, it is also described that the long term stability of the puncture sealant can be enhanced because the free nonionic surfactant included in the resin-based emulsion stabilizes an entirety of the puncture sealant (paragraph 0008).

Japanese Unexamined Patent Application Publication No. 2006-152239 describes an excellent puncture sealant including at least one synthetic rubber latex selected from the group consisting of SBR latex, NBR latex, MBR latex, carboxyl modified NBR latex, and carboxyl modified SBR latex; having a gelling factor measured by an automatic maron mechanical stability tester in compliance with JIS K 6387 of from 0.001 to 10%, and having superior storability and puncture hole sealability (paragraphs 0012 and 0019). Additionally, it is described that this puncture sealant preferably includes a resin-based emulsion in order to enhance sealability, and that the resin-based emulsion preferably uses a nonionic surfactant as an emulsifier from the perspective of stability. If an anionic surfactant and/or a cationic surfactant is used as the main emulsifier, the puncture sealant will destabilize and the emulsion will break down as a result of mixing with an antifreezing agent (paragraph 0029).

Tire puncture sealants like those described above are typically introduced into a tire from an air filling part of the tire. After the tire is filled with air to a specified air pressure, the tire puncture sealant reaches a puncture hole via the running of the vehicle. Moreover, aggregates of rubber particles form due to compressive forces and shear forces exerted on the tire as it contacts the ground and rotates, thereby sealing the puncture holes.

Recently, it is said that that tires that are in use are generally punctured at a rate of once per year. Therefore, the frequency at which a sealing agent is actually used is relatively low. Therefore, while tire puncture sealants must have superior sealability, they must also have the ability to endure storage in a vehicle for an extended period of time.

SUMMARY

The present technology provides a tire puncture sealant having both sealing performance and storage performance.

The inventors, as a result of diligent research into means for achieving the technology discovered that, in a tire puncture sealant, while a surfactant is an essential component from a practical point of view for stabilizing a natural rubber latex and enhancing storage performance, the surfactant is a factor that causes a loss of sealing performance. Furthermore, the inventors conceived that a tire puncture sealant having both storage performance and sealing performance could be obtained by producing a tire puncture sealant including a natural rubber latex and a surfactant, wherein a content of the surfactant is from 1.0 to 6.0 mass % of a solid content of the natural rubber latex and the surfactant comprises a non-ionic surfactant and an anionic surfactant at a mass ratio where the non-ionic surfactant/the anionic surfactant is in the range of from 1.0/1.0 to 1.0/5.0.

Specifically, the present technology is described hereinafter.

A tire puncture sealant in an example includes a natural rubber latex (A) and a surfactant (B), wherein a content of the surfactant (B) is from 1.0 to 6.0 mass % of a solid content of the natural rubber latex (A) and the surfactant (B) includes a non-ionic surfactant (B1) and an anionic surfactant (B2) at a mass ratio where the non-ionic surfactant (B1)/the anionic surfactant (B2)=1.0/1.0 to 1.0/5.0.

The non-ionic surfactant (B1) can be at least one of polyoxyethylene alkyl ether, polyoxyalkylene alkyl ether, and polyoxyethylene alkylamine. An HLB value of the non-ionic surfactant (B1) can be from 12.0 to 19.0%.

The tire puncture sealant can further include an ethylene-vinyl acetate copolymer resin emulsion (C) and an antifreezing agent (D). A content of the ethylene-vinyl acetate copolymer resin emulsion (C), in solid content, can be from 70 to 140 parts by mass per 100 parts by mass of the solid content of the natural rubber latex (A).

The antifreezing agent (D) can be at least one selected from the group consisting of propylene glycol, diethylene glycol, and glycerin. A content of the antifreezing agent (D), in solid content, can be from 70 to 200 parts by mass per a total 100 parts by mass of the solid content of the natural rubber latex (A) and a solid content of the ethylene-vinyl acetate copolymer resin emulsion (C).

A method is provided for manufacturing a tire puncture sealant including a natural rubber latex (A) and a surfactant (B), wherein a content of the surfactant (B) is from 1.0 to 6.0 mass % of a solid content of the natural rubber latex (A) and the surfactant (B) comprises a non-ionic surfactant (B1) and an anionic surfactant (B2) at a mass ratio where the non-ionic surfactant (B1)/the anionic surfactant (B2)=1.0/1.0 to 1.0/5.0. The method can include the steps of: producing a mixture including the natural rubber latex (A), the surfactant (B) and the ethylene-vinyl acetate copolymer resin emulsion (C); and adding an antifreezing agent (D) while suppressing a temperature increase of the mixture to 10° C. or less.

A copolymer ratio of the ethylene to the vinyl acetate in the ethylene-vinyl acetate copolymer resin in the ethylene-vinyl acetate copolymer resin emulsion (C), when expressed as a mass ratio, can be from 20:80 to 40:60.

In another example, the copolymer ratio of the ethylene to the vinyl acetate to the vinyl versatate of the ethylene-vinyl acetate copolymer resin in the ethylene-vinyl acetate copolymer resin emulsion (C), when expressed as a mass ratio, is from 5:5:90 to 10:5:85.

The non-ionic surfactant (B1) can be at least one selected from the group consisting of polyoxyethylene alkyl ether, polyoxyalkylene alkyl ether, and polyoxyethylene alkylamine, an HLB value is from 12.0 to 19.0%; and the anionic surfactant (B2) is sodium dodecyl sulfate.

A content of the ethylene-vinyl acetate copolymer resin emulsion (C), in solid content, can be from 70 to 140 parts by mass per 100 parts by mass of the solid content of the natural rubber latex (A).

A content of the antifreezing agent (D), in solid content, can be from 100 to 600 parts by mass per a total 100 parts by mass of the solid content of the natural rubber latex (A) and a solid content of the ethylene-vinyl acetate copolymer resin emulsion (C).

The antifreezing agent (D) can be at least one selected from the group consisting of propylene glycol, diethylene glycol, and glycerin.

According to the present technology, a tire puncture sealant having both sealing performance and storage performance can be provided.

BRIEF DESCRIPTION OF THE DRAWINGS

FIGS. 1-5 include tables illustrating working examples, comparative examples, and manufacturing examples in accordance with embodiments described herein.

DETAILED DESCRIPTION

The present technology is explained in detail below.
I: Tire Puncture Sealant

The tire puncture sealant of the present technology is a tire puncture sealant including a natural rubber latex (A) and a surfactant (B), wherein a content of the surfactant (B) is from 1.0 to 6.0 mass % of a solid content of the natural rubber latex (A) and the surfactant (B) includes a non-ionic surfactant (B1) and an anionic surfactant (B2) at a mass ratio where the non-ionic surfactant (B1)/the anionic surfactant (B2)=1.0/1.0 to 1.0/5.0.

1. Natural Rubber Latex (A)

The natural rubber latex (A) for use in the tire puncture sealant of the present technology is not particularly limited, and it is possible to use a rubber latex obtained by tapping the *Hevea brasiliensis* tree.

Natural rubber latices from which proteins have been removed (known as "deproteinized natural rubber latex") are preferred as the natural rubber latex (A). If a protein content of the natural rubber latex (A) is low, it is possible to reduce an amount of ammonia produced, which is desirable from the perspectives of preventing corrosion damage of steel cords by ammonia and preventing the generation of irritating odors.

Specific examples of the natural rubber latex that can be used include Deproteinized Natural Rubber Latex (SeLatex series, manufactured by SRI Hybrid Ltd.), Deproteinized Natural Rubber Latex (HA, manufactured by Nomura Trading Co., Ltd.), Ultra-low Ammonia Natural Rubber Latex (ULACOL, manufactured by Regitex Co., Ltd.), and the like.

2. Surfactant (B)

The surfactant (B) includes the non-ionic surfactant (B1) and the anionic surfactant (B2), and optionally may also include a cationic surfactant (B3).

A ratio of the content (mass) of the non-ionic surfactant (B1) to the content of the anionic surfactant (B2) in the tire puncture sealant of the present technology (ratio of the content of the non-ionic surfactant (B1) (parts by mass)/the content of the anionic surfactant (B2) (parts by mass), where the content of the non-ionic surfactant (B1) is expressed as 1.0. Hereinafter this is referred to as the "surfactant composition ratio (mass ratio)), and is not particularly limited as long as the surfactant composition ratio is within a range from 1.0/1.0 to 1.0/5.0, and preferably is within a range from 1.0/1.0 to 1.0/3.0, and more preferably is within a range from 1.0/1.0 to 1.0/2.0. Additionally, from 1.0/2.0 to 1.0/5.0 is also preferable. If the surfactant composition ratio is within this range, the sealing performance and storage performance will improve in a well-balanced manner.

The proportion of the content (mass) of the surfactant to the content (mass) of the solid content of the natural rubber latex in the tire puncture sealant of the present technology (hereinafter referred to also as the "surfactant content (mass %)") is within a range from 1.0 to 6.0 mass % because when 1.0 mass % or greater, sealing performance will be improved greatly and when 6.0 mass % or less, storage performance will be greatly improved.

If the surfactant content (mass %) and the surfactant composition ratio (mass ratio) are within the ranges described above, both the storage performance and the sealing performance of the tire puncture sealant of the present technology can be achieved.

(1) Non-Ionic Surfactant (B1)

The non-ionic surfactant (B1) is considered to, for example, be effective in enhancing stability.

Examples of the non-ionic surfactant (B1) include polyoxyethylene alkyl ether, polyoxyethylene alkyl phenyl ether, polyoxyethylene alkylamine, polyoxyethylene alkylamide, polyoxyethylene fatty acid ester, polyoxyethylene castor oil, polyoxyethylene fatty acid diester, polyoxyethylene rosin ester, polyoxyethylene lanolin ether, polyoxyethylene polyhydric alcohol ether, polyoxyethylene polyhydric alcohol fatty acid ester, polyhydric alcohol fatty acid ester, fatty acid alkanolamide, and the like non-ionic surfactants. A Hydrophile Lipophile Balance (HLB) value of the non-ionic surfactant (B1) is not particularly limited, but is preferably in a range from 12.0 to 19.0.

Examples of the polyoxyethylene alkyl ether include polyoxyethylene decyl ether, polyoxyethylene lauryl ether, polyoxyethylene cetyl ether, polyoxyethylene stearyl ether, polyoxyethylene oleyl ether, polyoxyethylene 2-ethylhexyl ether, polyoxyethylene isodecyl ether, polyoxyethylene tridecyl ether, polyoxyethylene isostearyl ether, and the like.

Specific examples of the polyoxyethylene lauryl ether include EMULGEN 108 (HLB=12.1), EMULGEN 109P (HLB=13.6), EMULGEN 120 (HLB=15.3), EMULGEN 123P (HLB=16.9), EMULGEN 147 (HLB=16.3), EMULGEN 150 (HLB=18.4) (all manufactured by Kao Corporation), and the like.

Specific examples of the polyoxyethylene cetyl ether include EMULGEN 220 (HLB=14.2, manufactured by Kao Corporation).

Specific examples of the polyoxyethylene stearyl ether include EMULGEN 320P (HLB=13.9) and EMULGEN 350 (HLB=17.8).

Specific examples of the polyoxyethylene oleyl ether include EMULGEN 409P (HLB=12.0), EMULGEN 420 (HLB=13.6), and EMULGEN 430 (HLB=16.2).

Examples of the polyoxyethylene alkyl phenyl ether include polyoxyethylene octylphenyl ether, polyoxyethylene nonylphenyl ether, polyoxyethylene dodecyl phenyl ether, polyoxyethylene styrenated phenyl ether, polyoxyethylene phenyl ether, polyoxyethylene benzyl ether, polyoxyethylene β-naphthyl ether, polyoxyethylene bisphenol A ether, polyoxyethylene bisphenol F ether, and the like.

Examples of the polyoxyethylene distyrenated phenyl ether include EMULGEN A-150 (HLB=18), EMULGEN A-60 (HLB=12.8), and EMULGEN A-90 (HLB=14.5) (all manufactured by Kao Corporation).

Examples of the polyoxyethylene alkylamine include polyoxyethylene laurylamine, polyoxyethylene beef tallow amine, polyoxyethylene stearylamine, polyoxyethylene oleylamine, polyoxyethylene beef tallow propylene diamine, polyoxyethylene stearyl propylene diamine, polyoxyethylene N-cyclohexylamine, polyoxyethylene metaxylylene diamine, and the like.

Specific examples of the polyoxyethylene laurylamine include BLAUNON L-207 (HLB=12.1), L-210 (HLB=13.6), L-220 (HLB=16.2), and L-230 (HLB=17.5) (all manufactured by Aoki Oil Industrial).

Specific examples of the polyoxyethylene stearylamine include AMIET 320 (HLB=15.4) and AMIET 308 (HLB=12.1) (all manufactured by Kao Corporation).

(2) Anionic Surfactant (B2)

The anionic surfactant (B2) is considered to, for example, be effective in suppressing increases in viscosity.

Examples of the anionic surfactant (B2) include alkyl sulfate ester salts, alkyl ether sulfate ester salts, polyoxyethylene alkyl ether sulfate ester salts, polyoxyethylene alkyl phenyl ether sulfate ester salts, alkylbenzene sulfonates, alkylnaphthalene sulfonates, salts of higher fatty acids (soaps), α-sulfo fatty acid methyl ester salts (α-MES), α-olefin sulfonates, alkane sulfonates, (mono) alkyl phosphate ester salts, polyoxy-mono and di-styryl phenylether monoester sulfosuccinates, alkyl phenoxy polyoxyethylene propyl sulfonates, and the like.

(3) Cationic Surfactant (B3)

Examples of the cationic surfactant (B3) include tetraalkyl ammonium chloride, trialkyl benzyl ammonium chloride, alkylamines, monooxyethylene alkylamines, polyoxyethylene alkylamines, and the like.

The non-ionic surfactant has a benefit of suppressing the generation of agglomerates in the repair liquid while in storage, and the anionic surfactant has a benefit of suppressing an increase in viscosity. The inventors have conceived that when the non-ionic surfactant and the anionic surfactant are used at the predetermined amounts, these benefits will influence each other, leading to unexpected effective benefits.

3. Ethylene-Vinyl Acetate Copolymer Resin Emulsion

The tire puncture sealant of the present technology may optionally include an ethylene-vinyl acetate copolymer resin (hereinafter referred to as "EVA") emulsion.

The term "ethylene-vinyl acetate copolymer resin" broadly refers to a copolymer resin including ethylene and vinyl acetate as monomeric units. Specifically, the copolymer resin is not particularly limited as long as it includes ethylene and vinyl acetate as monomeric units. Examples of the monomeric units that can be used include conventionally known monomer units in addition to ethylene and vinyl acetate such as ethylene-vinyl acetate-vinyl versatate copolymers containing a vinyl versatate ester (VEOVA), ethylene-vinyl acetate-acrylic ester copolymer resins containing an acrylic ester, and the like.

If the EVA is a copolymer of ethylene and vinyl acetate, a polymeric ratio (ethylene:vinyl acetate) thereof is not particularly limited, but preferably a mass ratio is in a range of from 20:80 to 40:60.

If the EVA is a copolymer of ethylene, vinyl acetate, and vinyl versatate, a polymeric ratio (ethylene:vinyl acetate:vinyl versatate) thereof is not particularly limited, but preferably a mass ratio is in a range of from 5:5:90 to 10:5:85.

It is sufficient that the copolymer be a copolymer, and may also be a block copolymer or a random copolymer.

Preferable examples of the ethylene-vinyl acetate copolymer resin emulsions specifically include Sumikaflex 408HQE, 401HQ, and 400HQ (all manufactured by Sumika Chemtex Co., Ltd.).

Preferable examples of the ethylene-vinyl acetate-vinyl versatate-based VA emulsions specifically include Sumikaflex 950HQ and 951HQ (all manufactured by Sumika Chemtex Co., Ltd.).

The solid content of the natural rubber latex/the solid content of the EVA emulsion is not particularly limited, but is preferably in a range of from 30/70 to 80/20, and more preferably in a range of from 50/50 to 80/20. If the solid content of the natural rubber latex/the solid content of the EVA emulsion is in this range, sealing performance and storage performance will be even more superior.

A total solid content of the natural rubber latex and the EVA emulsion relative to the tire puncture sealant of the present technology is not particularly limited, but is preferably in a range from 25 to 40 mass %. If the total solid content is within this range, sealing performance will be more excellent not only in center groove portions, but also in shoulder groove portions.

4. Antifreezing Agent (D)

The tire puncture sealant of the present technology may optionally include an antifreezing agent.

The antifreezing agent is not particularly limited, but specific, preferable examples include ethylene glycol, propylene glycol, and glycerin. One of these may be used alone, or two or more may be used in any combination.

In the present technology, a compounded amount of the antifreezing agent is preferably from 70 to 200 parts by mass, more preferably from 80 to 180 parts by mass, and even more preferably 100-150 parts by mass per 100 parts by mass of the total solid content of the solid content of the natural rubber latex and the solid content of the ethylene-vinyl acetate copolymer resin emulsion. If the antifreezing component content is within this range, sealing performance, storage performance and antifreezing performance will all be excellent.

5. Viscosity Modifier (E)

The tire puncture sealant of the present technology may optionally include a viscosity modifier.

Examples of the viscosity modifier that can be used include water.

6. Other Optional Components

In addition to the components mentioned above, the tire puncture sealant of the present technology can optionally contain additives such as viscosity modifiers, tackifiers, fillers, antiaging agents, antioxidants, pigments (dyes), plasticizers, thixotropic agents, UV absorbents, flame retardants, surfactants (including leveling agents), dispersants, dehydrating agents, antistatic agents, and the like.

Water can be used as the viscosity modifier. The viscosity modifier is not particularly limited so long as it is clean water, but is preferably deionized water, and more preferably distilled water.

The viscosity modifier is added so as to adjust a viscosity of the tire puncture sealant of the present technology immediately after production to from approximately 40 mPa·s to approximately 150 mPa·s, and preferably to from 40 mPa·s to 110 mPa·s, when measured in a 20° C. atmosphere using a BL type viscometer (No. 2 rotor). Sealing performance deteriorates if the viscosity of the tire puncture sealant is too high.

The tackifier is not particularly limited, and specific examples include, for example, rosin resins such as rosin esters, polymerized rosin esters, modified rosins, and the like; terpene resins such as terpene phenols, terpene glycols, aromatic terpenes, and the like; hydrogenated terpene resins (terpene resins to which hydrogen has been added); phenolic resins; xylene resins; and the like. The tackifier may be used alone or may be used in any combination of two or more types.

The filler can be an organic or inorganic filler of any form. Specific examples include, for example, fumed silica, calcined silica, precipitated silica, pulverized silica, molten silica; diatomaceous earth; iron oxide, zinc oxide, titanium oxide, barium oxide, magnesium oxide; calcium carbonate, magnesium carbonate, zinc carbonate; pyrophyllite clay, kaolin clay, calcined clay; carbon black; fatty acid treated products, resin acid treated products, urethane compound treated products, and fatty acid ester treated products thereof; and the like.

Specific examples of the antiaging agent include compounds such as hindered phenol compounds and the like.

Specific examples of the antioxidant include butylhydroxytoluene (BHT), butylhydroxyanisole (BHA), and the like.

Specific examples of the pigment include inorganic pigments such as titanium oxide, zinc oxide, ultramarine, iron red, lithopone, lead, cadmium, iron, cobalt, aluminum, hydrochlorides, sulfates, and the like; organic pigments such as azo pigments, phthalocyanine pigments, quinacridone pigments, quinacridonequinone pigments, dioxazine pigments, anthrapyrimidine pigments, anthanthrone pigments, indanthrone pigments, flavanthrone pigments, perylene pigments, perinone pigments, diketopyrrolopyrrole pigments, quinonaphthalone pigments, anthraquinone pigments, thioindigo pigments, benzimidazolone pigments, isoindoline pigment, carbon black, and the like; and the like.

Specific examples of the plasticizer include diisononyl phthalate (DINP); dioctyl adipate and indecyl succinate; di(ethylene glycol) dibenzoate and pentaerythritol esters; butyl oleate and methyl acetyl ricinoleate; tricresyl phosphate and trioctyl phosphate, propylene glycol adipate polyesters and butylene glycol adipate polyesters; and the like.

Specific examples of the thixotropic agent include Aerosil (manufactured by Nippon Aerosil), Disparlon (manufactured by Kusumoto Chemicals, Ltd.), and the like.

Specific examples of the flame retardant include chloroalkyl phosphates, dimethyl phosphates, methyl phosphates, bromine or phosphorus compounds, ammonium polyphosphates, neopentyl bromide polyethers, brominated polyethers, and the like.

Specific examples of the antistatic agent include quaternary ammonium salts; hydrophilic compounds such as polyglycols, ethylene oxide derivatives, and the like; and the like.

II: Method of Manufacturing the Tire Puncture Sealant

The method of manufacturing the tire puncture sealant of the present technology is not particularly limited, but can be, for example, a method in which the natural rubber latex, the VEOVA copolymer resin emulsion, and, optionally, the surfactant, the antifreezing agent, and the various additives are placed in a reaction vessel and then sufficiently kneaded under reduced pressure using a mixing machine such as a mixer, or the like.

When manufacturing the tire puncture sealant of the present technology, it is preferable to suppress an increase in a temperature of the mixed system to 10° C. or less when adding the antifreezing agent (especially when adding the glycol-based compound) to a mixed system that contains the natural rubber latex. By suppressing the increase in the temperature to 10° C. or less, it is possible to suppress an amount of gel produced in the natural rubber latex (referred to as "NR gel") to less than 2 mass %, preferably less than 1 mass %, and more preferably less than 0.5 mass %. However, if the increase in the temperature exceeds 10° C., the amount of gel produced in the natural rubber latex will increase dramatically, and may reach 3 mass % or higher.

A method for suppressing the increase in the temperature is not particularly limited, but can involve, for example, cooling the mixed system or the antifreezing agent (especially the glycol-based compound) in advance; using a temperature-regulating function of a mixing machine; or controlling a rate at which the antifreezing agent (especially the glycol-based compound) is added. These methods may be used alone or may be used in any combination of two or more.

It is believed that if the temperature of the natural rubber latex increases dramatically, gel will be produced due to dispersion instability and coagulation. Therefore, suppressing the increase in the temperature to 10° C. or less when adding the glycol-based compound to the mixed system containing the natural rubber latex is not limited to the tire puncture sealant of the present technology, and can be applied to, for example, the tire puncture sealants described in the Background section, which also contain a natural rubber latex. This will lead to a reduction of the amount of gel produced in the natural rubber latex.

III. Method of Using the Tire Puncture Sealant

Next, a method of using the tire puncture sealant of the present technology will be described. However, the method of using the tire puncture sealant of the present technology is not limited to the following method.

First, the tire puncture sealant of the present technology is injected into a tire via the air-filling part of the tire. The method for injecting the tire puncture sealant of the present technology into the tire is not particularly limited, and it is possible to use a conventionally known method, for example, a method involving use of a syringe or a spray. An amount of the tire puncture sealant injected into the tire is not particularly limited and is selected as appropriate according to, for example, the size of the puncture hole.

Next, the tire is filled with air until a predetermined air pressure is reached.

The vehicle is then driven. Aggregates of natural rubber particles and the like are formed by compressive forces and shear forces exerted when the tire rotates and comes into contact with the ground, thereby enabling sealing of the puncture hole.

EXAMPLES

The present technology will now be described in greater detail using the following examples, but is in no way limited to these examples.

I: Tire Puncture Sealant

1. Manufacturing

The components listed in FIG. 1 (Working Examples) and FIG. 2 (Comparative Examples) were blended in a mixer according to the compositions shown in FIG. 1 so as to obtain the tire puncture sealants shown in FIG. 1 and FIG. 2.

2. Evaluation of Sealing Performance

"Sealing performance" refers to performance when sealing a hole in the center groove portion of a tire (hereinafter simply called "center groove portion sealing performance) and/or performance when sealing a hole in the shoulder groove portion of a tire (hereinafter simply called "shoulder groove portion sealing performance), and is evaluated according to the following test methods.

"Excellent sealing performance" refers to excellent sealing performance in the center groove portion and/or the shoulder groove portions.

Sealing performance is evaluated as "excellent" if the center groove portion sealing performance is "○" and shoulder groove portion sealing performance is "◉", "○" or "x".

(1) Center Groove Portion Sealing Performance

A puncture hole (4 mm in diameter) is made in the center groove portion of a tread of a tire.

Next, the punctured tire is mounted on a drum tester, the tire puncture sealant is injected via a tire valve and the tire is then filled with air until the pressure inside the tire reaches 250 kPa.

The tire is then driven for eight minutes at a speed of 30 km/h under a load of 350 kg, after which a presence or absence of air seepage is confirmed both visually and by spraying soapy water in the vicinity of the puncture hole.

If there is no air seepage, the center groove portion sealing performance is evaluated as "excellent" ("○"), and if there is air seepage, the center groove portion sealing performance is evaluated as poor ("x").

(2) Shoulder Groove Portion Sealing Performance

A puncture hole (4 mm in diameter) is made in the shoulder groove portion of the tread of a tire.

Next, the punctured tire is mounted on a drum tester, the tire puncture sealant is injected via the tire valve and the tire is then filled with air until the pressure inside the tire reaches 200 kPa.

The tire is then subjected to intermittent driving, in which the tire is repeatedly driven for one minute at a speed of 30 km/h under a load of 350 kg and then stopped, until there is no air seepage observed when evaluated as described above.

When evaluating the results of this procedure, the shoulder groove portion sealing performance is evaluated as "extremely excellent" ("⊙") if air seepage ceases after carrying out the intermittent running from 1 to 10 cycles, "excellent" ("○") if air seepage ceases after carrying out the intermittent running from 11 to 15 cycles, and "poor" ("x") if air seepage has not ceased after carrying out the intermittent running 16 or more cycles.

3. Storage Performance

If storage stability is evaluated as "○" and viscosity stability is evaluated as "○" or "◉", storage performance is evaluated to be excellent.

(1) Storage Stability

The tire puncture sealant is placed in a container. Following nitrogen substitution, the container is sealed and then subjected a vibration test in which vibrations of a frequency of 20 Hz and an amplitude of ±3 mm are continually applied for seven days in an 80° C. atmosphere. Immediately thereafter, the condition of the tire puncture sealant is observed.

The state of dispersion is observed visually, and if there is no precipitation/separation, storage stability is evaluated as "○", and if there are aggregates or films, storage stability is evaluated as "x".

(2) Viscosity Stability

Immediately before and immediately after the vibration test, a pre-vibration viscosity and a post-vibration viscosity are measured in a 20° C. atmosphere using a BL type viscometer (No. 2 rotor, 60 rpm).

The viscosity stability is evaluated as "extremely excellent" (◉) if the post-vibration viscosity is less than 5% higher than the pre-vibration viscosity, evaluated as "excellent" ("○") if the post-vibration viscosity is at least 5% but less than 50% higher than the pre-vibration viscosity and as "poor" ("x") if the post-vibration viscosity is 50% or higher than the pre-vibration viscosity.

4. Results

The evaluation results of sealing performance and storage performance are shown in the Working Examples of FIGS. 1 and 2, and the Comparative Examples of FIG. 3.

The tire puncture sealants according to Working Examples 1 to 22 included from 1.0 to 6.0 mass % of the surfactant (B) with respect to the solid content of the natural rubber latex (A), and the surfactant (B) included the non-ionic surfactant (B1) and an anionic surfactant (B2) at a mass ratio where the non-ionic surfactant (B1)/the anionic surfactant (B2)=1.0/1.0 to 1.0/5.0. It is clear from FIGS. 1-2 and FIG. 3 that the tire puncture sealants according to Working Examples 1 to 22 displayed superior sealing performance and storage performance.

On the other hand, the tire puncture sealants of the Comparative Examples, wherein the content of the surfactant (B) and/or the content ratio of the non-ionic surfactant (B1) to the anionic surfactant (B2) were not in the ranges described above failed to display at least one of the desired performances of sealing performance and storage performance.

The components shown in FIGS. 1-3 are as follows. Additionally, the compounded amounts of components A to D are expressed in parts by mass of their respective solid contents (nonvolatile matter) and the compounded amount of component E is expressed in parts by mass of the entire component (including the volatile matter).

Component A
  NR latex: Natural rubber latex (Hytex HA, manufactured by Nomura Trading Co., Ltd.; Solid content=60 mass %)

Component B
  Component B1
  Non-ionic surfactant 1: Polyoxyethylene oleyl ether (Emulgen 430, manufactured by Kao Corporation; HLB=16.2)
  Non-ionic surfactant 2: Polyoxyethylene myristyl ether (Emulgen 4085, manufactured by Kao Corporation; HLB=18.9)
  Non-ionic surfactant 3: Polyoxyethylene lauryl ether (Emulgen 108, manufactured by Kao Corporation; HLB=12.1)
  Non-ionic surfactant 4: Polyoxyethylene stearylamine (Emulgen 320, manufactured by Kao Corporation; HLB=15.4)
  Component B2
  Anionic surfactant: Sodium lauryl sulfate (Emal 10PT, manufactured by Kao Corporation)

Component C
  EVA emulsion 1: Ethylene-vinyl acetate copolymer resin emulsion (Sumikaflex 408HQE, manufactured by Sumika Chemtex Co., Ltd.; Ethylene:Vinyl acetate=40:60; Solid content=approximately 50 mass %)
  EVA emulsion 2: Ethylene-vinyl acetate copolymer resin emulsion (Sumikaflex 401HQ, manufactured by Sumika Chemtex Co., Ltd.; Ethylene:Vinyl acetate=30:70; Solid content=approximately 55 mass %)
  EVA emulsion 3: Ethylene-vinyl acetate copolymer resin emulsion (Sumikaflex 400HQ, manufactured by Sumika Chemtex Co., Ltd.; Ethylene:Vinyl acetate=20:80; Solid content=approximately 55 mass %)
  EVA emulsion 4: Ethylene-vinyl acetate-vinyl versatate copolymer resin emulsion (Sumikaflex 950HQ, manufactured by Sumika Chemtex Co., Ltd.; Ethylene:Vinyl acetate:Vinyl versatate=10:5:85; Solid content=approximately 53 mass %)

Component D
  Antifreezing agent: Propylene glycol (Grade 1 reagent, manufactured by Wako Pure Chemical Industries, Ltd.)

Component E
  Water

Additionally, the following items in FIGS. 1-3 are defined below.
  Surfactant content (mass %)
  The ratio of the content (mass) of the solid content of the surfactant (Component B) to the content (mass) of the solid content of the natural rubber latex (Component A) in the tire puncture sealant.
  Surfactant composition ratio (mass ratio)
  The ratio of the content (mass) of the non-ionic surfactant (Component B1) to the content of the anionic surfactant (Component B2) in the tire puncture sealant.
  Viscosity (mPa·s, 20° C.)
  The viscosity of the tire puncture sealant immediately after production, measured in a 20° C. atmosphere using a BL type viscometer (No. 2 rotor) (unit of measurement: mPa·s).

II: Method of Manufacturing the Tire Puncture Sealant

1. Manufacturing

Using a blending machine, the components shown in FIGS. 4-5 (Manufacturing Examples 1 to 20) were blended using a mixer in an order of the NR latex (A), the EVA emulsion (C), and the surfactant (B) so as to obtain mixed systems containing the NR latex.

Next, the antifreezing agent (D) was added to the mixed systems. In Manufacturing Examples 1 to 13, temperatures of the mixed systems were controlled so that the increase in the temperature of the mixed systems was 10° C. or less when the antifreezing agent was added, but no particular temperature control was carried out in Manufacturing Examples 14 to 20.

The tire puncture sealants of Manufacturing Examples 1 to 20 were manufactured according to the method described above.

2. Measuring the Amount of NR Gel Produced

Following manufacture, the tire puncture sealants were filtered, gel produced at the time of manufacturing was filtered off and dried, and the solid content mass of the gel was measured. Then, a mass % of the amount of NR gel produced was calculated by dividing the solid content mass of the gel by a solid content mass of the NR latex and the solid content mass of the gel.

FIGS. 4-5 show the increase in the temperature (° C.) when the antifreezing agent was added to each of the tire puncture sealants and the amount of NR gel produced. Moreover, indications that the amount of NR gel produced of was "<0.5" in Manufacturing Examples 1 to 20 means that the amount of gel produced was less than 0.5 mass %.

3. Evaluation Method for the Amount of NR Gel Produced

An amount of gel produced of less than 0.5 mass % was evaluated as "A", 0.5 or higher and less than 1.0 mass % as "B", 1.0 or higher and less than 2.0 mass % as "C", 2.0 or higher and less than 3.5 mass % as "D", and 3.5 mass % or higher as "E". "A" evaluations were considered "passing" scores.

4. Results

The tire puncture sealants of Manufacturing Examples 1 to 13, in which the increase in the temperature of the mixed system when adding the antifreezing agent (D) to the mixed system was suppressed to 10° C. or less, were all evaluated as "A" (the amount of NR gel produced during manufacture was less than 0.5 mass %). On the other hand, the tire puncture sealants of Manufacturing Examples 14 to 20, in which the increase in the temperature exceeded 10° C., were all evaluated as "B" (the amount of NR gel produced during manufacture was 0.5 mass % or greater).

These results show that, compared to when the increase in temperature exceeds 10° C., it is possible to greatly reduce the amount of NR gel produced by suppressing the increase in the temperature of the mixed system to 10° C. or less when adding the antifreezing agent (D).

In FIGS. 4-5, the compounded/added amount of each component is expressed in parts by mass of the solid content thereof, with the solid content of the ethylene-vinyl acetate emulsion (C) being 100 parts by mass.

The components shown in FIGS. 4-5 are as follows.

A) NR latex
  Natural rubber latex (Hytex HA, manufactured by Nomura Trading Co., Ltd.; Solid content=60 mass %)
B) Non-ionic surfactant (1)
  Polyoxyethylene oleyl ether (Emulgen 430, manufactured by Kao Corporation)
  Anionic surfactant
  Sodium lauryl sulfate (Emal 10PT, manufactured by Kao Corporation)
C) EVA emulsion (1)
  Ethylene-vinyl acetate copolymer resin emulsion (Sumikaflex 408HQE, manufactured by Sumika Chemtex Co., Ltd.; Ethylene:Vinyl acetate=40:60; Solid content=approximately 50 mass %)
  EVA emulsion (3)
  Ethylene-vinyl acetate copolymer resin emulsion (Sumikaflex 400HQ, manufactured by Sumika Chemtex Co., Ltd.; Ethylene:Vinyl acetate=20:80; Solid content=approximately 55 mass %)
  EVA emulsion (4)
  Ethylene-vinyl acetate-vinyl versatate copolymer resin emulsion (Sumikaflex 950HQ, manufactured by Sumika Chemtex Co., Ltd.; Ethylene:Vinyl acetate:Vinyl versatate=10:5:85; Solid content=approximately 53 mass %) D) Propylene glycol (Grade 1 reagent, manufactured by Wako Pure Chemical Industries, Ltd.)
  Diethylene glycol (Grade 1 reagent, manufactured by Wako Pure Chemical Industries, Ltd.)
  Glycerin (Grade 1 reagent, manufactured by Wako Pure Chemical Industries, Ltd.)

What is claimed is:

1. A tire puncture sealant comprising a natural rubber latex and a surfactant, wherein a content of the surfactant is from 1.0 to 6.0 mass % of a solid content of the natural rubber latex and the surfactant comprises a non-ionic surfactant and an anionic surfactant at a mass ratio where the non-ionic surfactant/the anionic surfactant =1.0/2.0 to 1.0/5.0.

2. The tire puncture sealant according to claim 1, wherein the non-ionic surfactant is at least one selected from the group consisting of polyoxyethylene alkyl ether, and polyoxyethylene alkylamine, and an HLB value of the non-ionic surfactant is from 12.0 to 19.0.

3. The tire puncture sealant according to claim 1, further comprising an ethylene-vinyl acetate copolymer resin emulsion and an antifreezing agent.

4. The tire puncture sealant according to claim 3, wherein a content of the ethylene-vinyl acetate copolymer resin emulsion, in solid content, is from 70 to 140 parts by mass per 100 parts by mass of the solid content of the natural rubber latex.

5. The tire puncture sealant according to claim 3, wherein the antifreezing agent comprises at least one selected from the group consisting of propylene glycol, diethylene glycol, and glycerin.

6. The tire puncture sealant according to claim 5, wherein a content of the antifreezing agent, in solid content, is from 70 to 200 parts by mass per a total 100 parts by mass of the solid content of the natural rubber latex and a solid content of the ethylene-vinyl acetate copolymer resin emulsion.

7. The tire puncture sealant according to claim 3, wherein a solid content of the natural rubber latex/the solid content of the ethylene-vinyl acetate emulsion is in a range of from 30/70 to 80/20.

8. The tire puncture sealant according to claim 3, wherein a solid content of the natural rubber latex/the solid content of the ethylene-vinyl acetate emulsion is in a range of from 50/50 to 80/20.

9. The tire puncture sealant according to claim 3, wherein a total solid content of the natural rubber latex and the ethylene-vinyl acetate emulsion relative to the tire puncture sealant is in a range of from 25 to 40 mass %.

10. The tire puncture sealant according to claim 3, wherein the antifreezing agent comprises from 80 to 180 parts by mass per 100 parts by mass of the total solid content of a solid content of the natural rubber latex and a solid content of the ethylene-vinyl acetate copolymer resin emulsion.

11. The tire puncture sealant according to claim 3, wherein the antifreezing agent comprises from 100 to 150 parts by mass per 100 parts by mass of the total solid content of a solid content of the natural rubber latex and a solid content of the ethylene-vinyl acetate copolymer resin emulsion.

* * * * *